United States Patent [19]

Miller

[11] Patent Number: 4,898,264
[45] Date of Patent: Feb. 6, 1990

[54] SEMIACTIVE DAMPER WITH MOTION RESPONSIVE VALVE MEANS

[75] Inventor: Lane R. Miller, Fuquay-Varina, N.C.

[73] Assignee: Lord Corporation, Erie, Pa.

[21] Appl. No.: 331,838

[22] Filed: Apr. 3, 1989

[51] Int. Cl.[4] .............................................. F16F 9/18
[52] U.S. Cl. ..................................... 188/275; 188/280;
188/285; 188/299; 188/316; 188/322.13;
188/378; 267/221; 248/562; 248/636
[58] Field of Search ................ 188/299, 275, 378–380,
188/281–282, 280, 300, 322.13, 311, 316, 284,
285, 180, 313; 267/221, 64.11, 64.28, 64.16,
64.15; 248/550, 562, 636

[56] References Cited

U.S. PATENT DOCUMENTS

| | | | |
|---|---|---|---|
| 1,947,332 | 2/1934 | Christen | 200/6 |
| 2,042,915 | 6/1936 | Twist | 200/52 |
| 2,966,124 | 12/1960 | Casey, III | 105/197 |
| 3,255,850 | 6/1966 | Gray | 188/280 |
| 3,414,092 | 12/1968 | Speckhart | 188/275 |
| 3,807,678 | 4/1974 | Karnopp et al. | 248/358 R |
| 4,207,770 | 6/1980 | Grushow | 73/517 R |
| 4,384,700 | 5/1983 | Thompson et al. | 248/550 |
| 4,468,739 | 8/1984 | Woods et al. | 364/424 |
| 4,491,207 | 1/1985 | Boonchanta et al. | 188/299 |
| 4,743,000 | 5/1988 | Karnopp | 267/218 |
| 4,786,034 | 11/1988 | Heess et al. | 267/64.15 |
| 4,821,849 | 4/1989 | Miller | 188/280 |
| 4,838,392 | 6/1989 | Miller et al. | 188/277 |

Primary Examiner—Douglas C. Butler
Attorney, Agent, or Firm—Bell, Seltzer, Park & Gibson

[57] ABSTRACT

The fluid circuitry connecting variable volume chambers of the semiactive damper includes valve assemblies which collectively effect mechanical implementation of a preselected damper control policy that is based in part upon changes in the sign of the absolute velocity of a supported member of the system of which the damper forms a part. One of the valve assemblies has an inertial body which is connected to a movable system member but which remains substantially stationary during system operation. The inertial body and a valve member of the assembly are interconnected by a linkage which in one embodiment includes a frictional type connector, and which in another embodiment includes a dashpot.

16 Claims, 2 Drawing Sheets

SEMIACTIVE DAMPER WITH MOTION RESPONSIVE VALVE MEANS

This invention relates to mounting systems, such as the suspension systems of automobiles and similar vehicles, that attenuate the transmission of vibratory and/or shock forces between relatively movable supported and supporting members. The invention more specifically relates to systems of the foregoing type which include a semiactive damper assembly that during operation is rapidly switched, in accordance with the dictates of a preselected control policy, between damping states in which the damping coefficient of the damper is respectively relatively high and relatively low.

BACKGROUND OF THE INVENTION

A known control policy for semiactive dampers is predicated upon the sign of the product of the relative velocity between the supported and supporting members interconnected by the damper, and the absolute velocity of the supported member. More specifically, such policy dictates that the damping coefficient of the damper be relatively high when the aforesaid product is greater than zero, i.e., is positive or plus, and that the damping coefficient be relatively low when the aforesaid product is less than zero, i.e., is negative or minus. The damper may be either of the "on/off" type whose damping characteristic is a function of the relative velocity and is substantially constant when the damper is in its "on" state, or of the "continuously variable" type whose on-state damping force is a function of the absolute velocity of the supported system member. Electronic monitoring, calculating and/or driving devices are customarily used to determine when changes in the damping coefficient of the damper state should take place, and to then effect such changes. In at least some systems, however, performance of the foregoing functions by electronic means may make the systems unacceptably expensive, and/or may detract from their reliability and/or durability.

SUMMARY OF THE INVENTION

With the foregoing in mind, the present invention provides a mounting system wherein operation of a semiactive damper, in accordance with a preselected control policy based in part upon the absolute velocity of the supported one of the supported and supporting members interconnected by the damper assembly, may be effected entirely or in desired part by purely mechanical means, without the use of electronic devices.

In the system of the present invention, the fluid circuit of the damper assembly includes a valve assembly whose operating condition changes automatically in response to changes in the sign of the absolute velocity of the supported member of the system. The aforesaid valve assembly includes first and second cooperating and relatively movable valve members, the first of which is connected to and movable in unison with the supported system member. An inertial body having large mass and inertia is connected to the first valve member, and thus also to the supported system member, by resilient means that permits the body to remain substantially stationary as the first valve member and the supported system member undergo movement. Linkage means interconnects the second valve member and the inertial body. The linkage means so controls the relative movement between the first and second valve members as to automatically effect those changes in the operating condition of the valve assembly that are dictated by changes in the sign (i.e., direction) of the supported system member.

In one embodiment of the invention, which is particularly suitable for a mounting system having an "on/off" semiactive damper whose damping characteristic is substantially constant when the damper is in its "on" state, the linkage means interconnecting the inertial body and the second valve member includes a frictional type of connection that at certain times prevents and at other times permits movement of the second valve member in unison with the first valve member. In another embodiment, wherein the semiactive damper is of a "continuously variable" type whose damping force changes in accordance with the absolute velocity of the supported system member, during those times when the damper is "on," the linkage means interconnecting the second valve member and the inertial body includes a dashpot device.

In addition to the foregoing valve assembly, which automatically effects those changes in the damping force that are dictated by the preselected control policy due to changes in the sign of the absolute velocity of the supported member, the fluid circuitry may and preferably does include a second valve assembly that automatically and mechanically effects those damping coefficient changes that are dictated by the control policy due to changes in the sign of the relative velocity between the supported and supporting members. The second valve assembly may include a first valve member connected to one of the supported and supporting members, for movement in unison therewith, and a second cooperating valve member that is connected to the other of the supported and supporting members by a frictional connection that at times permits relative movement between the second valve member and the one of the supported and supporting members to which it is connected.

DESCRIPTION OF THE DRAWINGS

Other features of the invention will be apparent from the following description of illustrative embodiments thereof, which should be read in conjunction with the accompanying drawings, in which.

DESCRIPTION OF THE ILLUSTRATED EMBODIMENTS

Figure 1:
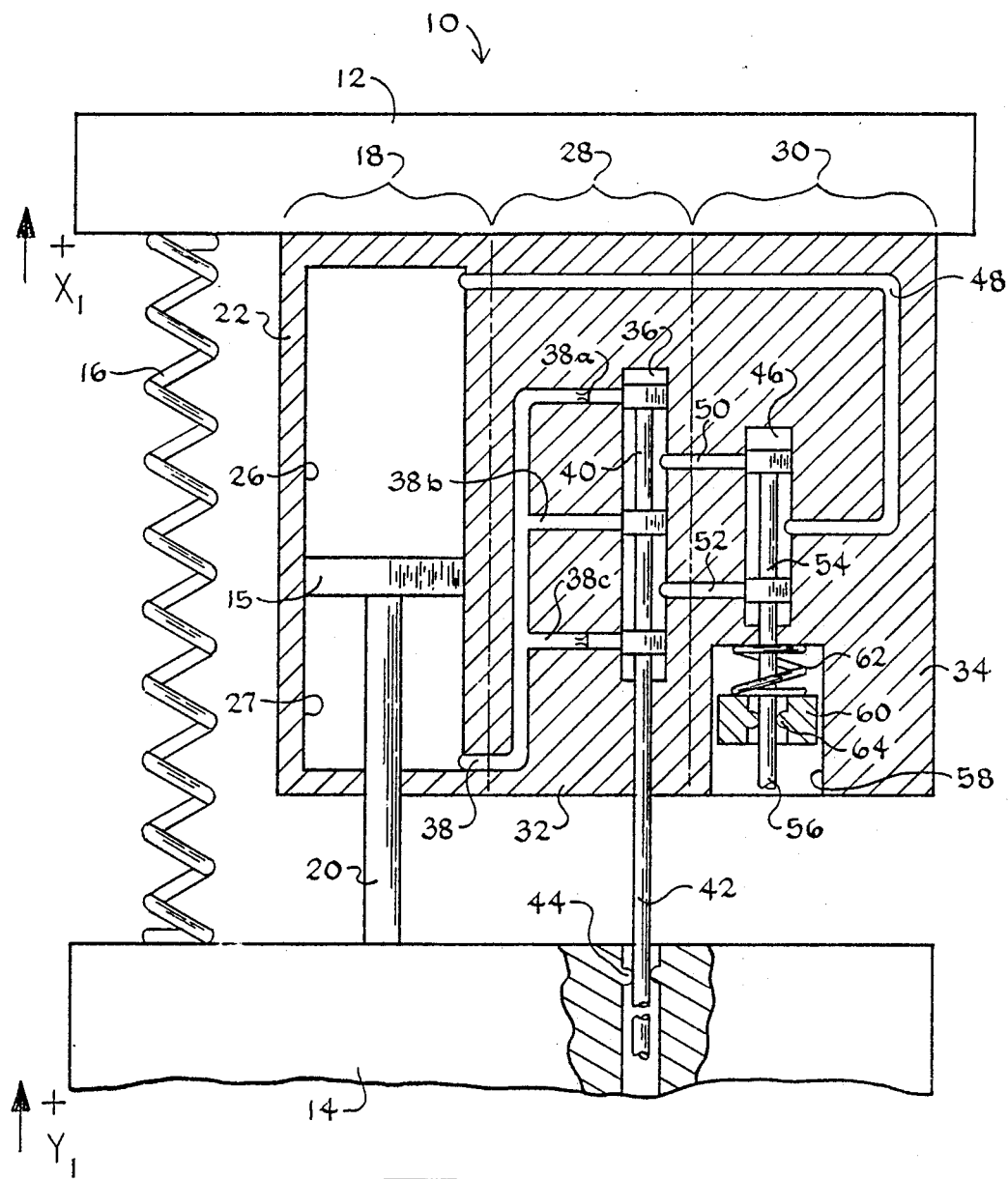
FIG. 1 is a schematic view, partially in elevation and partially in vertical section, of a mounting system that includes a semiactive damper assembly of the on/off type having fluid circuit and related components in accordance with the invention.

The force attenuating mounting system 10 shown in the drawing interconnects vertically spaced and relatively movable supported and supporting members 12, 14, respectively. Members 12, 14 may for instance be the body and wheel/axle components of an automobile or other vehicle. In such a utilization, one customary function of system 10 would be to isolate supported member 12 insofar as possible from vibratory and/or other forces transmitted to member 14 by road surface irregularities and other disturbances.

The character $X_1$ designates the absolute vertical velocity of supported member 12, it being arbitrarily indicated that this is positive when in an upward direction, and thus is negative when in a downward direction. The same sign convention and the character $Y_1$ similarly designates the absolute vertical velocity of supporting member 14.

System 10 includes compression spring means 16 and a semiactive damper assembly 18 which extend in substantially parallel relationship to each other between supported and supporting members 12, 14, and are connected to such members. Damper assembly 18 is illustratively of the on/off hydraulic piston and cylinder type. Its piston rod 20 extends from one end of its cylinder 22 and is connected to one of the members 12, 14, illustratively to supporting member 14. The opposite end of cylinder 22 is connected to the other member 12. Relative vertical movement between supported and supporting members 12, 14 causes relative vertical movement between rod 20 and cylinder 22. This in turn creates a pressure differential and flow of hydraulic fluid through a fluid circuit, described hereinafter, interconnecting the variable volume chambers 26, 27 disposed within cylinder 22 upon opposite sides of the piston 15 of the damper assembly. The damping characteristic of damper 18 is rapidly changed during operation of the assembly, by varying the flow resistance of the fluid circuit, in accordance with the dictates of a suitable control policy based in part upon the sign of the absolute velocity of supported member 12. One such control policy dictates that the damper be "on" and its damping characteristic be relatively high when the sign of the product of the absolute velocity ($X_1$) of supported member 12 times the relative velocity ($X_1-Y_1$) of members 12, 14 is greater than zero, i.e., is plus or positive; and that the damper be "off" and its damping characteristic be of relatively low magnitude when the sign of the aforesaid product is less than zero, i.e., is minus or negative.

In addition to fluid passageways hereinafter described, the fluid circuit interconnecting damper chambers 26, 27 includes flow-controlling valve assemblies 28, 30 that automatically effect purely mechanical implementation of the aforesaid control policy, without the use of electronic components. As schematically shown in the drawing, the housing members 32, 34 of the respective valve assemblies 28, 30 are connected to supported member 12 for movement in unison therewith, and illustratively are also laterally connected with each other and with cylinder 22 of damper assembly 18. As is indicated by phantom lines in the drawing, however, the assemblies 18, 28, 30 may instead be separated from each other, in which event suitable bridging connectors would be provided between the associated fluid passageways thereof.

The main body 32 of valve assembly 28 includes a vertical cylindrical cavity 36. A passageway 38 communicating with damper chamber 27 has three parallel branches 38a, 38b, 38c that communicate with cavity 36 at spaced locations along the length thereof. Passages 38a, 38c permit only relatively restricted flow of fluid passing therethrough, while passageway 38b permits relatively free fluid flow. A cooperating valve spool member 40 is disposed within and is relatively movable axially of chamber 36. Valve member 40 has three cylindrical lands or spools which are disposed at spaced locations along its length and which, in the illustrated central position of the valve member, obstruct fluid flow between chamber 36 and passageway 38 via any of the three branches 38a, 38b, 38c thereof. Valve member 40 is connected to supporting system member 14 by linkage means that includes an elongate linkage member 42 and a frictional connector member 44. Linkage member 42, which may be and illustratively is an extension of the reduced-diameter stem or central portion of valve member 40, extends downwardly from member 40 through a suitable opening and associated sealing means (not shown) provided within that part of valve housing member 32 underlying cavity 36. Adjacent its lower end, linkage 42 is joined by frictional connector 44 to supporting member 14 of system 10. The frictional forces between linkage 42 and connector 44 are sufficient to maintain valve member 40 and supporting member 14 in a coupled relationship, wherein the valve member undergoes vertical movement in unison with member 14, for as long as there is no contact between an end of member 40 and an end of cavity 36. The travel of valve members 34,54 relative to each other will customarily be small in comparison to the travel of members 12, 14 relative to each other. When contact occurs between one of the opposite ends of valve member 40 and a thereto confronting end surface of cavity 36, the frictional forces are insufficient to maintain a coupled stationary relationship between linkage member 42 and supporting member 14 and relative movement between them occurs. This permits movement of valve members 40, 32 in unison with each other, until such time as the sign of the relative velocity ($X_1-Y_1$) of members 12, 14 changes and contact occurs between the opposite end of valve member 40 and the opposite end of cavity 36. The operating condition of valve assembly 28 therefore changes automatically upon change in the sign of the relative velocity between members 12, 14. The sign of the relative velocity is negative or minus when the distance between members 12, 14 is decreasing, i.e., when damper assembly 12 is contracting, and is positive or plus when the distance between members 12, 14 is increasing, i.e., when damper assembly 12 is extending.

Valve assembly 30 is responsive to the absolute velocity ($X_1$) of supported member 12, and flow conditions through such valve change automatically upon change in the sign (i.e., direction) of the absolute velocity of member 12. Housing member 34 of valve assembly 30 has a vertically extending cylindrical cavity 46 that is connected approximately midway of its length to upper chamber 26 of damper assembly 18 by a fluid passageway 48. Passageways 50, 52 connect cavity 46 of valve assembly 30 and cavity 36 of valve assembly 28. The passageways 50, 52 communicate with cavity 46 adjacent opposite ends thereof and with cavity 36 at locations intermediate the center and respective ones of the opposite ends of such cavity. A valve spool member 54 within cavity 46 has two enlarged land or spool portions which, in the illustrated central position of the valve member, are aligned with and obstruct flow through respective ones of the passageways 50, 52. A linkage member 56 is connected to or, as shown, formed integrally with the center shaft of valve spool member 54. Member 56 projects downwardly through a suitable opening, with which suitable sealing means (not shown) is associated, within the lower end of cavity 46, into an underlying cavity 58 of valve housing member 34. An inertial body 60, which illustratively is of generally cylindrical shape, is supported within cavity 58 by a weak spring 62. The mass of body 60 is large in comparison to that of valve member 54, but typically would be small in relation to that of supported member !2. Spring 62 is illustratively of a coil type. It encircles a portion of linkage member 56, has one of its ends connected to valve housing 34, and the other of its ends connected to inertial body 60. The inertia of body 60 and the low force of weak spring 62 are such that body 60 remains substantially stationary as valve housing 34 undergoes vertical movement in unison with supported member 12 during operation of system 10. Body 60 and valve member 54 are connected by linkage means that includes linkage member 56 and a frictional type connector 64 that is so located upon body 60 as to frictionally engage the section of member 56 projecting through body 60. The magnitude of the frictional force between linkage member 56 and inertial body 60 is such that valve spool member 54 remains substantially stationary, and does not move relative to inertial body 60, except when vertical movement of supported member 12 and valve housing 34 causes either of the opposite ends of chamber 46 to engage the confronting end of valve member 54. When this occurs, the frictional connection 64 between inertial body 60 and linkage member 56 automatically releases, permitting movement of valve spool member 54 relative to inertial body 60 and in unison with valve housing member 34. Such movement continues until the aforesaid vertical movement of valve member 34 ceases or until its direction (i.e., upwardly or downwardly) and sign (i.e., positive or negative) changes. When the sign of the absolute velocity ($X_1$) of member 12 is positive (i.e., member 12 is moving upwardly), the valve members 34, 54 of valve assembly 30 are so located relative to each other that fluid flow can occur across the valve assembly between passageway 48 and passageway 52, but not between passageways 48, 50. When the sign and direction of the absolute velocity of member 12 change, and become negative and downwardly, the aforesaid flow condition across valve assembly 30 automatically changes so that flow can occur between passageways 48, 50, but not between passageways 48, 52. Valve assembly 30 therefore is responsive to, and changes its flow conditions in accordance with, changes in the sign (direction) of the absolute velocity $X_1$ of supported member 12.

Valve assembly 28 is similarly responsive to changes in the sign of the relative velocity $(X_1-Y_1)$ across damper assembly 18, i.e., the relative velocity of supported and supporting members 12, 14. The sign of the relative velocity across the damper assembly is positive when the damper assembly is extending, and is negative when it is contracting or compressing. The relative movement that occurs between valve spool member 40 and valve housing member 32 of valve assembly 28, at those times when damper 18 is extending, permits relatively free fluid flow between passageways 38, 50 via the unrestricted central branch passageways 38b, and permits only restricted fluid flow between passageways 38, 52 via branch passageway 38c. When damper assembly 18 is undergoing compression, the relative positions then automatically assumed by members 32, 40 of valve assembly 28 permit relatively restricted fluid flow between passageways 38, 50 via branch passageway 38a, and permit relatively free fluid flow between passageways 38, 52 via passageway 38b.

Since valve assemblies 28, 30 are in series with each other, the combined effect of them is to cause the damping characteristic of damper assembly 18 to be relatively high when the product of the relative velocity $(X_1-Y_1)$ of members 12, 14 times the absolute velocity $(X_1)$ of member 12 is positive, or greater than zero, and to cause the damping characteristic of damper 18 to be relatively low when the aforesaid product is negative or less than zero. This is illustrated by the following examples.

1. Damper 18 is contracting, i.e., $(X_1-Y_1)$ is negative. Member 12 is moving upwardly, i.e., $X_1$ is positive. The fluid flow from damper chamber 26 to chamber 27 is via passageways 48, 52, 38b and 38. Since passageway 38b is unrestricted, the damping characteristic of damper 18 is relatively low.
2. Damper 18 is contracting and member 12 is moving downwardly. The fluid flow from damper chamber 26 to chamber 27 is via passageways 48, 50, 38a and 38. Since passageway 38a is a restricted one, the damping characteristic of damper 18 is relatively high.
3. Damper 18 is extending and member 12 is moving upwardly. Fluid flow from damper chamber 27 to chamber 26 occurs via passageway 38, 38c, 52 and 48. Since passageway 38c is a restricted one, the damping characteristic of damper 18 is relatively high.
4. Damper 18 is extending, and member 12 is moving downwardly. The fluid flow from damper chamber 27 to chamber 26 is via passageways 38, 38b, 50 and 48. Since passageway 38b is unrestricted, the damping coefficient of damper 18 is relatively low.

It will therefore be appreciated that the present apparatus eliminates the need for electronic means for monitoring or calculating the movements of members 12, 14, or for solving the control policy algorithm, or for controlling a valve of In lieu of the valve assembly 28 shown in FIG. 1 and previously described, the valve assembly 30 might in some utilizations be in series with some other type of valve means, such as one employing a plurality of check valves or even one having an electronically controlled valve member, that similarly undergoes condition changes in response to changes in the sign of the relative velocity across the damper.

Figure 2:
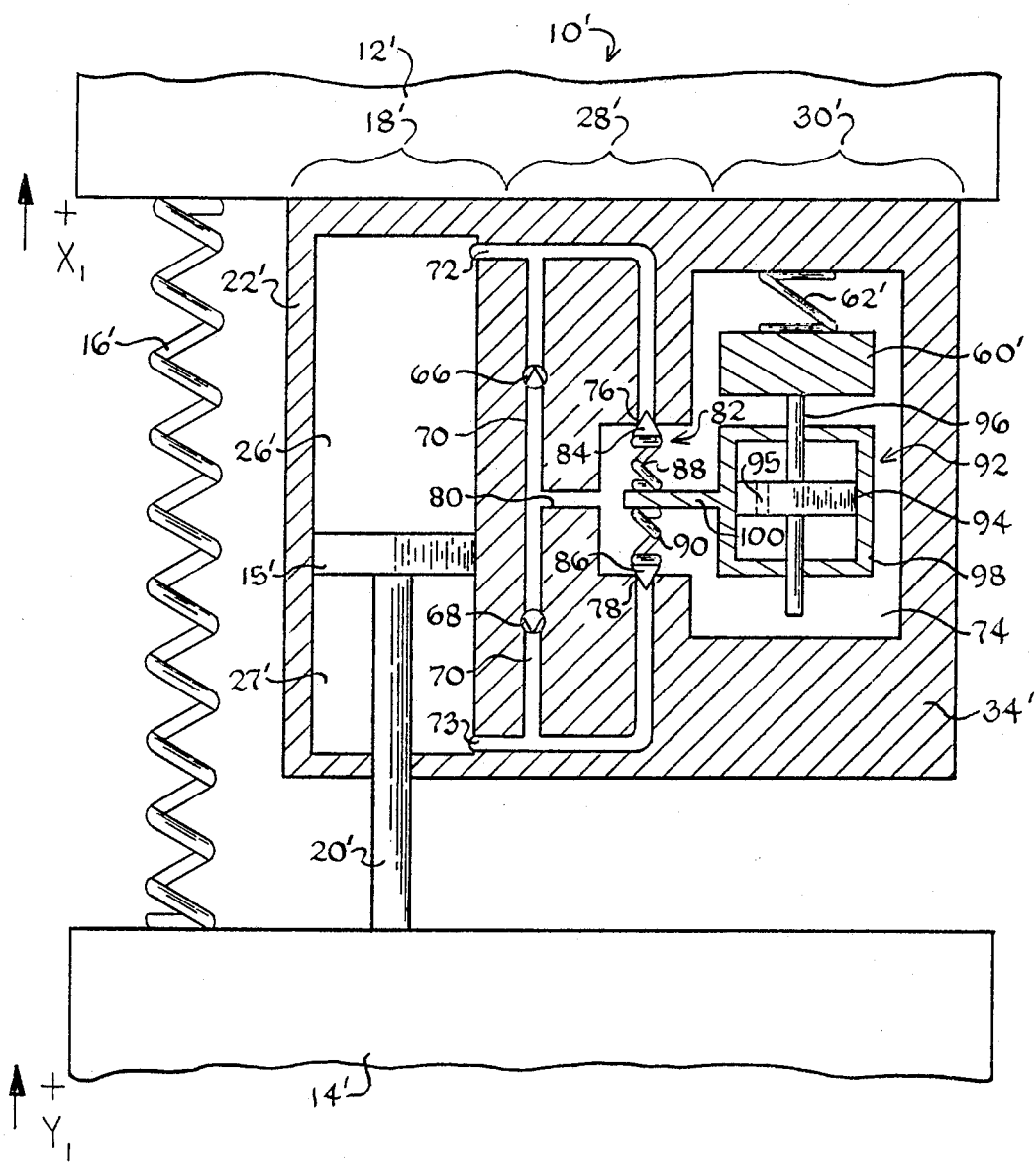
FIG. 2 is a view similar to FIG. 1 of a mounting system in which the semiactive damper assembly is of the continuously variable type.

In the mounting system 10, shown in FIG. 2 of the drawings, to which reference is now made, components identical or similar to previously-described components of system 10 of FIG. 1 are designated by the same reference numerals with the addition of a prime designation. The fluid circuit of the semiactive damper assembly 18' of system 10' includes, in addition to various fluid passageways hereinafter described, a valve assembly 28' for effecting flow-condition changes in automatic response to changes in the sign of the relative velocity between supported and supporting system members 12', 14'. The valve assembly 28' consists of a pair of check valve members 66, 68 located within a fluid passageway 70 that extends between passageways 72, 73 respectively communicating with variable volume chambers 26', 27' of semiactive damper assembly 18'. Check valves 66, 68 permit fluid flow from passageway 70 to passageways 72, 73, but not in opposite directions.

The fluid circuit of damper assembly 18' also includes a valve assembly 30' that changes the flow conditions through the circuit in response to changes in the sign (i.e., direction) of the absolute velocity of the supported system member 12'. Additionally, when damper 18' is in its "on" state, valve assembly 30' causes the magnitude of the damping force of damper assembly 18' to be a function of and to change in accordance with the magnitude of the absolute velocity $X_1$ of the supported system member 12'. That is, the valve assembly 30' causes damper 18' to be a "continuously variable"

damper, rather than only one of the "on/off" type. An interior chamber 74 of housing member 34' of valve assembly 30' has vertically aligned ports 76, 78 that communicate with extensions of passageways 72, 73, respectively. Chamber 74 also communicates via passageway 80 with the section of passageway 70 between check valves 66, 68. A valve member 82 within chamber 74 includes vertically spaced valve elements 84, 86 that are supported by spring means, in the form of relatively stiff coil spring elements 88, 90, adjacent respective ones of the chamber ports 76, 78. Each valve element 84, 86 and its adjacent spring element 88, 90 constitutes pressure relief setting means for creating a pressure drop that is approximately equal to the force in the spring element. An inertial body 60', having a large inertia, is supported within chamber 74 by a weak spring 62'. The inertia of body 60' and the low strength of spring 62, are such as to cause body 60' to remain substantially stationary as supported member 12' and valve housing 34' undergo vertical movement.

Inertial body 60' is connected to valve member 82 by linkage means which imparts to the valve member forces that are approximately proportional to the absolute velocity $X_1$ of the velocity of supported member 12', and which cause the pressure drop across the valve member to be approximately proportional to the absolute velocity of member 12'. The aforesaid linkage means includes a fluid-filled dashpot or damper device 92. The piston 94 of device 92 has an orifice 95 of preselected size extending therethrough, and is fixedly connected by piston rod 96 to inertial body 60'. Piston 94 therefore remains substantially stationary during operation of system 10'. The cylinder member 98 of device 92 has a rigid linkage member 100 connected to or formed integrally with it. Adjacent its free outer end, linkage member 100 is connected to the confronting inner ends of valve spring elements 88, 90. In the centered "rest" position thereof shown in FIG. 2, springs 88, 90 carry no significant load and merely maintain valve elements 82, 84 in close proximity to the respective ports 76, 78. When supported system member 12' and valve housing 34' undergo vertical movement, the spring 88 or 90 on one side of linkage member 100 is subjected to compression loading. At the same time, the valve element 84 or 86 on the opposite side of linkage member 100 undergoes relative separation from its associated port 76 or 78. This is because the damping forces then generated by device 92 resist movement of its cylinder 98 and of linkage member 100 in unison with housing 34, Damper assembly 18 is in its "off" state, wherein its damping force is of relatively low magnitude, when it is extending and supported member 12' is moving downwardly. Fluid then flows from chamber 27' to chamber 26' of damper assembly 18' via passageway 73, chamber 74, passageway 80, the section of passageway 70 containing check valve 66, and passageway 72. The fluid flow is relatively free since port 78 is then separated from valve element 86 by the downward movement of valve housing 34'. The damper assembly is also in its "off" state when it is contracting and supported member 12' is moving upwardly. Fluid then flows relatively freely from chamber 26' to chamber 27' of damper 18' via passageway 72, chamber 74, passageway 80, the section of passageway 70 containing check valve 68, and passageway 73, since valve element 84 and port 76 are then separated from each other.

The foregoing is in accordance with the dictates of the control policy which specifies that damper 18' be in its "off" state when the sign of the product of the relative velocity $(X_1-Y_1)$ between members 12', 14' times the absolute velocity $(X_1)$ of member 12' is less than zero, i.e., is negative.

At those times when the aforesaid product is positive or plus, the valve assemblies 28', 30' automatically cause damper 18' to be in its "on" state, and further cause its damping force to be a function of the absolute velocity of supported member 12'. Thus, in the situation where damper 18' is extending and supported member 12 is moving upwardly, the fluid flow from chamber 27' to chamber 26' of damper 18' is via passageway 73, chamber 74, passageway 80, the section of the passageway 70 containing check valve 66, and passageway 72. However, the fluid flow along such path is restricted since dashpot device 92 and linkage member 100 then subject the upward end of spring 90 to a downwardly directed force proportional to the absolute velocity of supported member 12'. Such force, in conjunction with the upward movement of valve housing 34', compresses spring element 90. The spring element 90 and associated valve element 86 of valve member 82 then act as a "pressure relief" device to cause the pressure drop across valve element 86, and thus the damping force of damper assembly 18', to be a function of the absolute velocity of supported member 12' of system 10'. The same result ensues when supported member 12' is moving downwardly and damper assembly 18' is contracting, at which time the fluid flow from damper chamber 26' to damper chamber 27' is via passageway 72, chamber 74, passageway 80, the section of passageway 70 containing check valve 68, and passageway 73. The flow of fluid along such path is restricted since dashpot device 92 and linkage 100 subject the lower end of spring element 88 to an upwardly directed force while the downward movement of housing 34, subjects the upper end of the spring to a downwardly directed force. The resulting compressive force upon spring 88 is proportional to the absolute velocity of supported member 12'. The pressure drop across valve element 84, and thus the damping force of damper assembly 18', is therefore a function of the absolute velocity of supported member 12'. It will thus be appreciated that the valve assemblies of system 10' automatically implement the control policy of a damper assembly, such as the damper assembly 18' of FIG. 2, which is of the continuously variable type.

While specific embodiments of the invention have been shown and described, this was for purposes of illustration only, since various modifications will be apparent to those skilled in the art. For instance, the inertial body could be resiliently connected directly to the supported system member, rather than only indirectly connected to it, and the valve assemblies responsive to changes in the relative velocity between the supported and supporting members could be of various different types.

I claim:

1. A system for attenuating the transmission of vibratory and shock forces between a supported member and a supporting member, comprising:
    a semiactive damper assembly interconnecting said members, said damper assembly having variable volume chambers containing hydraulic fluid and being operable in accordance with a preselected control policy based in part upon the sign of the absolute velocity of said supported member;

fluid circuit means interconnecting said chambers of said damper assembly for at times dictated by said control policy permitting relatively free flow of said fluid between said chambers, and for at other times dictated by said policy significantly restricting the flow of said fluid between said chambers;

said circuit means including a flow-controlling valve assembly responsive to changes in said sign of said absolute velocity of said supported member;

said valve assembly including first and second cooperating and relatively movable valve members, said first one of said valve members being connected to and movable with one of said supported and supporting members;

a body having a large inertia;

resilient means connecting said body to said first one of said valve members such that said body remains substantially stationary during movement of said one of said valve members; and linkage means connecting said second one of said valve members to said body.

2. A system as in claim 1, wherein said linkage means includes linkage members movable relative to each other.

3. A system as in claim 1, wherein said linkage means includes an automatically engageable and disengageable frictional connector permitting movement of said second valve member with said first valve member when forces inducing said movement are of a magnitude greater than frictional forces resisting said movement.

4. A system as in claim 3, wherein said first one of said valve members of said valve assembly is a valve housing having a cavity therein, and wherein said valve second one of said valve members of said valve assembly is a valve spool located within said cavity.

5. A system as in claim 1, wherein said circuit means further includes a second valve assembly including a valve housing member connected to one of said supported and supporting members and having a cavity therein, a valve spool member mounted within said cavity, and linkage means interconnecting said valve spool member and the other of said supported and supporting members for movement of said valve spool member at times relative to said other of said supported and supporting members, and at other times for movement of said valve spool member in unison with said other of said supported and supporting members.

6. A system as in claim 1, wherein said linkage means includes a dashpot.

7. A system as in claim 6, wherein said dashpot has relatively movable cylinder and piston members, one of said dashpot members being connected to said first one of said valve members and the other of said dashpot members being connected to said body.

8. A system as in claim 7, wherein said second one of said valve members includes first and second valve elements and first and second spring elements respectively associated therewith.

9. A system as in claim 8, wherein said spring elements are aligned with each other and with said valve elements.

10. A system as in claim 9, wherein said linkage means imposes forces upon said spring elements that are a function of said absolute velocity of said supported member.

11. A system as in claim 10, wherein said linkage means imposes said forces upon one of spring elements when said sign of said absolute is positive and upon the other of said spring elements when said sign is negative.

12. In a semiactive damper having variable volume fluid chambers and circuit means for conducting and controlling fluid flow between said chambers, the improvement comprising:

said circuit means including a valve assembly;

said valve assembly having relatively movable valve members, a body having large inertia, resilient means for so interconnecting said body and one of said valve members that said body remains substantially stationary when said one of said valve members undergoes movement, and linkage means interconnecting said body and the other of said valve members.

13. A semiactive damper as in claim 12, wherein said linkage means includes a dashpot having relatively movable cylinder and piston rod members.

14. A semiactive damper as in claim 13, wherein said one of said valve members is connected to one of said cylinder and piston rod members, and another of said valve members is connected to the other of said cylinder and piston rod members.

15. A semiactive damper as in claim 12, wherein said linkage means includes a frictional connector.

16. A system for attenuating the transmission of vibratory and shock forces between a supported member and a supporting member, comprising:

a continuously variable semiactive damper assembly interconnecting said members, said damper assembly having variable volume chambers containing hydraulic fluid and being operable in accordance with a preselected control policy based in part upon the sign of the absolute velocity of said supported member;

fluid circuit means interconnecting said chambers of said damper assembly for at times dictated by said control policy permitting relatively free fluid flow between said chambers, and for at other times dictated by said policy restricting said fluid flow to an extent which is a function of the magnitude of said absolute velocity;

said circuit means including a flow-controlling valve assembly responsive to changes in the magnitude and said sign of said absolute velocity of said supported member;

said valve assembly including first and second cooperating and relatively movable valve members, said first one of said valve members being connected to and movable with one of said supported and supporting members;

a body having a large inertia;

resilient means connecting said body to said first one of said valve members such that said body remains substantially stationary during movement of said one of said valve members; and linkage means connecting said second one of said valve members to said body.

* * * * *